United States Patent [19]

Obradovich

[11] Patent Number: 4,630,657

[45] Date of Patent: Dec. 23, 1986

[54] VERSATILE ROUTER GUIDE APPARATUS

[76] Inventor: George Obradovich, 812 Kennedy Ave., Schererville, Ind. 46375

[21] Appl. No.: 738,444

[22] Filed: May 28, 1985

[51] Int. Cl.$^4$ ............................................. B27C 5/10
[52] U.S. Cl. ......................... 144/144.5 GT; 83/574; 144/134 D; 144/372; 409/182
[58] Field of Search ......... 83/574; 144/136 C, 134 D, 144/134 R, 136 R, 145 R, 27, 372; 409/182, 185, 214, 218; 408/115 R

[56] References Cited

U.S. PATENT DOCUMENTS

| | | | |
|---|---|---|---|
| 2,752,961 | 7/1956 | Melgaard | 144/134 D |
| 2,957,507 | 10/1960 | Vargo | 144/134 D |
| 4,044,805 | 8/1977 | Gronholz | 409/182 |
| 4,155,383 | 5/1979 | Welliver | 144/134 D |
| 4,237,762 | 12/1980 | Winter | 83/574 |
| 4,281,694 | 8/1981 | Gorman | 83/574 |
| 4,320,678 | 3/1982 | Volk | 83/574 |
| 4,516,453 | 5/1985 | Parham | 83/574 |

Primary Examiner—W. D. Bray
Attorney, Agent, or Firm—Richard G. Kinney; Walter Leuca

[57] ABSTRACT

A versatile router guide apparatus or kit is disclosed comprising a pair of side rails and a pair of headpieces, which may be releasably secured together to form a "modified box type" router guide. When so secured the guide may be clamped to a workpiece between the headpieces and a router moved in the guide to form transverse dadoes or cuts therein. Bridges are also provided that may be temporarily fixed across the rails at strategic positions therealong, and projecting router stops attached to headpieces so that precise interrupted cuts or dadoes can be made in the workpiece. Further, the router may be releasably positioned within the guide, at one location relative to the guide and the guide unclamped and moved longitudinally along the workpiece to make longitudinal cuts or grooves therein. Still further, the bridges may be secured to the rails to form a rigid guide, with the headpieces removed, a pivot attachment affixed to one bridge and with the router between the guide rails, the guide apparatus pivoted so as to make arcuate cuts or grooves in the workpiece as well as straight radial grooves.

14 Claims, 25 Drawing Figures

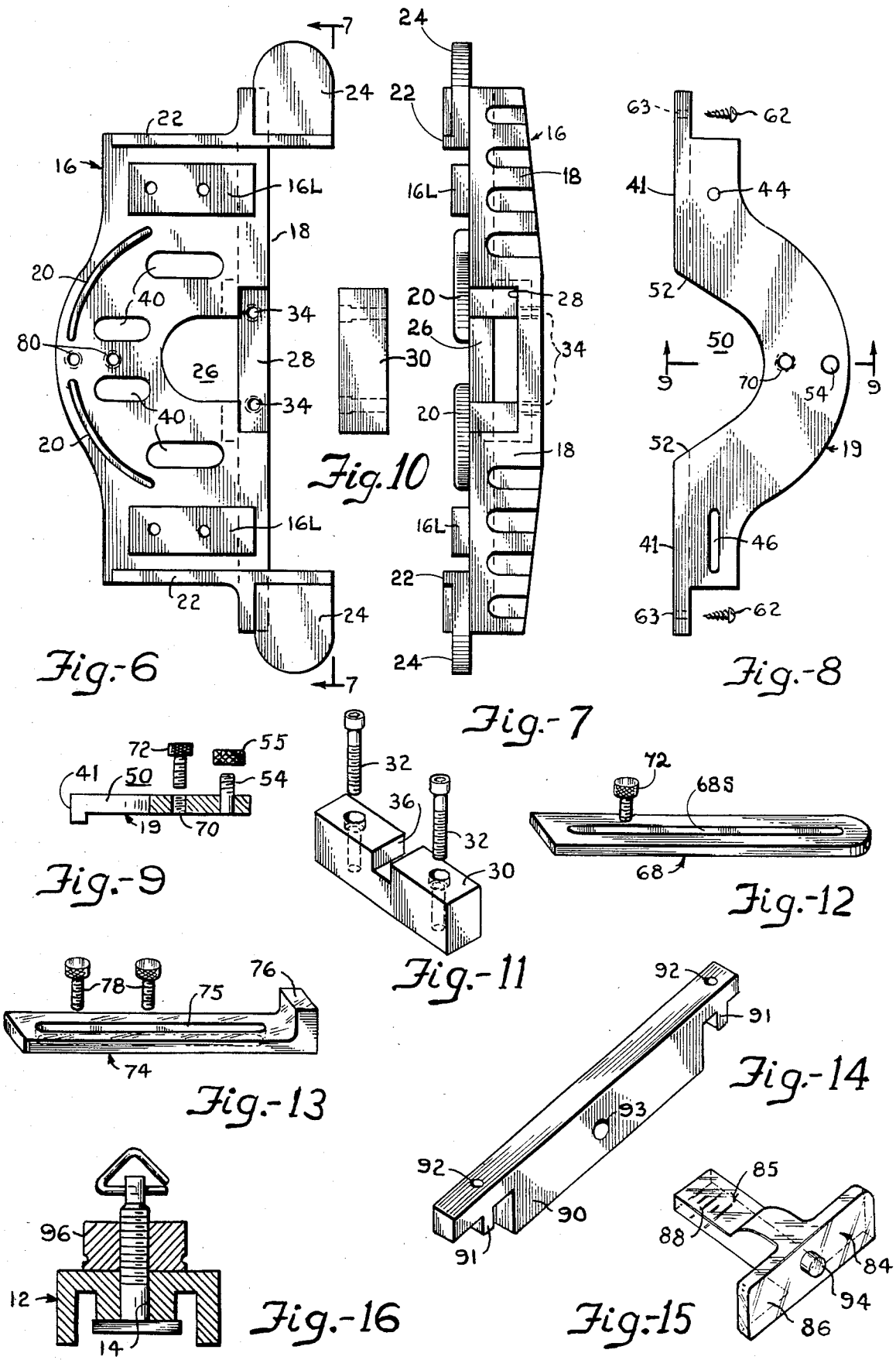

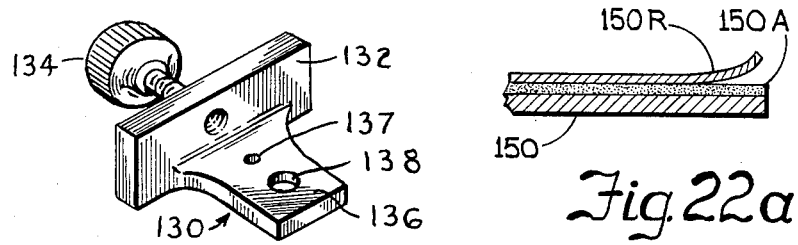
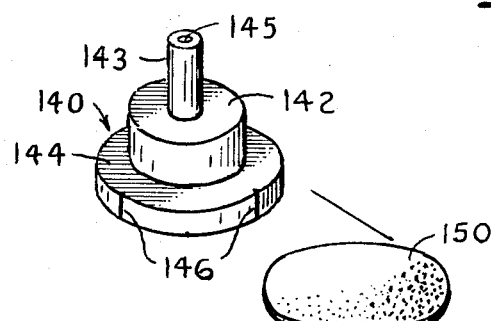
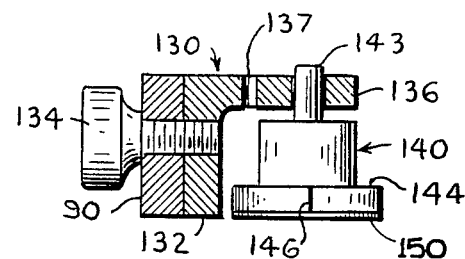
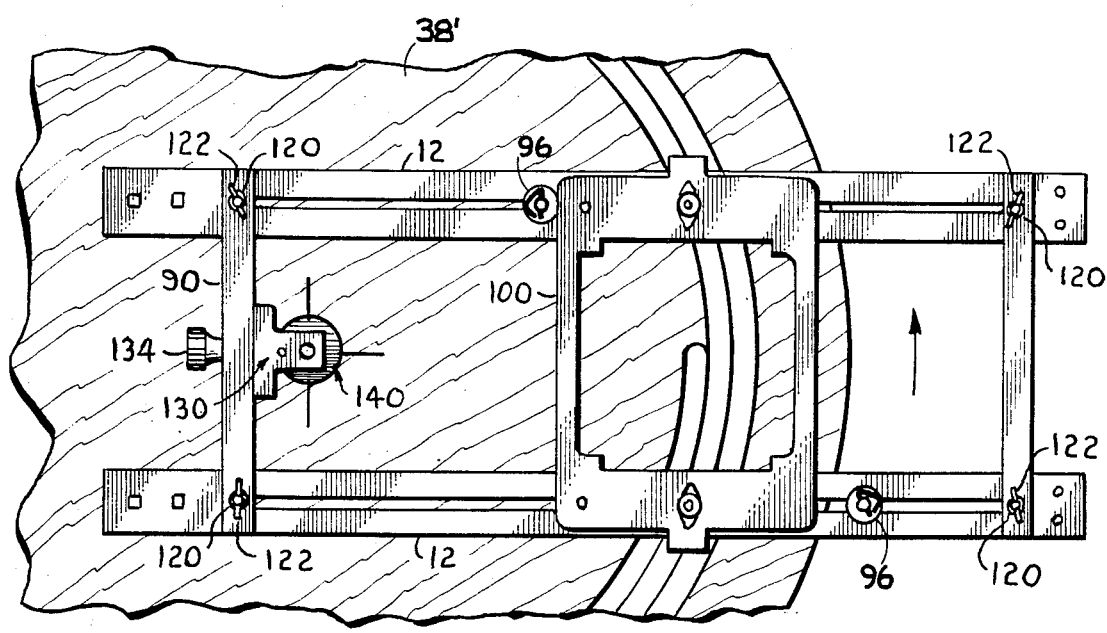

VERSATILE ROUTER GUIDE APPARATUS

FIELD OF THE INVENTION

The present invention is directed to improvements in router guides and is especially directed to providing a versatile router guide apparatus and kit.

BACKGROUND OF THE INVENTION

Powered hand held routers have become a common woodworking tool used for professional cabinetmaker shops and furniture manufacturers as well as in home workshops. The movable powered router is a powerful tool capable of making edges of precise and decorative designs as well as dadoes and grooves.

The powered hand router is, however, difficult to control as any weekend cabinetmaker can attest. Simple box guides or jigs are shown, for example, at page 85 of the March 1978 issue of Popular Science, (and page 150 of the October 1984 issue of Popular Mechanics) but these must be constructed for nearly each separate workpiece and cut desired.

There have been suggested, in the past, custom work tables with guide units for such routers. See for example, U.S. Pat. Nos. 2,957,507; 3,782,431; 4,291,735; 4,434,824; 3,770,031; 4,215,731 and 4,155,303.

While such devices may serve a limited purpose, there still exists a need for a simple, easily useable, economically manufacturable guide that is versatile and allows the router to be taken to the workpiece and there make cuts and grooves of many different types and outlines.

SUMMARY OF THE INVENTION

A guide apparatus for a router constructed in accordance with the principles of the present invention is readily and easily moved to and adjusted to fit different sized workpieces at different locations. Such a versatile guide includes a pair of side rail members and means attachable to each of said members and spacing between them holding them parallel to one another at a spacing so as to receive a router therebetween in a guiding fit. The apparatus being assembled so as to accommodate different sized workpieces and used on them without the need of attachment to any separate base or table.

ADVANTAGES

The present invention provides an improvement in the performance and efficiency of the traditional "box" type router guide and yet provides a broadened scope of router operations over the typical box router guide.

Improved performance is brought about by the present invention router guide's ability to adjust to a wide range of workpieces compared to the typical box guide which is effective only on a workpiece of specific dimension. Also the present invention has the ability to adjust (within certain limits) to a workpiece which has one of its sides tapered.

Improved performance is gained through use of substitutable bit entry indicators which define a corresponding bit's true entry point into a workpiece, and/or the bit's prospective line-of-cut. The typical box guide's front lower member functions in this manner only so long as the original bit is used or a subsequently larger one is used, after which it ceases to function as an accurate indicator for a lesser bit.

Improved efficiency is brought into the routing of multiple in-line blind dadoes most of which are repeatable by the use of the various integrated blind-making accessories of the versatile router guide. To do multiple dadoes a box guide would require some manner of makeshift stops in the router's path, and the dadoes would not be repeatable without re-assembly of stops.

The range of routing operations of the guide is extended by the introduction of a router containment cradle. With it, the guide can make controlled, parallel to the edge grooves on long workpieces, as well as make blind dadoes.

Routing operations are broadened to include circle routing by the arrangement of certain parts of the former guide and the addition of the pivot hitch.

The invention, together with further advantages thereof, may best be understood by reference to the following description taken in connection with the accompanying drawings, in the several figures of which, like reference numerals identify like elements.

BRIEF DESCRIPTION OF THE DRAWINGS

FIG. 6 is a plan view, in more detail, of another part, a headpiece, of the guide apparatus of FIG. 1.

FIG. 7 is an elevational view of the headpiece of FIGS. 1 and 6, as seen from the plane defined by the line 7—7 in FIG. 7 when looking in the direction of the arrows.

FIG. 8 is a more detailed plan view of another part, the other headpiece, of the guide apparatus of FIG. 1.

FIG. 9 is a sectional view of the headpiece of FIGS. 1 and 8 as seen from the plane defined by the line 9—9 in FIG. 8, when looking in the direction of the arrows.

FIG. 10 is a side view of another part of the apparatus of FIG. 1, a replaceable splinter and alignment block.

FIG. 11 is a perspective view of the block of FIG. 10, with a router groove formed therein, with its attachment machine screws shown in exploded view.

FIGS. 12 and 13 are each perspective views, exploded, of additional parts, namely stops and the means of affixing them, which additional parts may be used with the guide assembly of FIGS. 1-11.

FIG. 14 is a perspective view of an additional part, a bridge or stop fence.

FIG. 15 is a perspective view of a stop gauge that may be used with the bridge of FIG. 14.

FIG. 16 is a cross sectional view of an additional part, a slot stop button, that may be used in the siderails of FIGS. 1-5.

FIG. 21 is a perspective view of an additional part, namely a pivot hitch.

FIG. 22 is a perspective view of yet another part, namely a pedestal pivot member.

FIG. 22a is a sectional partial view of a component that is used in securing the pivot member to a workpiece.

FIG. 23 is a sectional view of the parts of FIGS. 21 and 22 assembled together on the side of the stop fence of FIG. 14.

FIG. 24 is a plan view of the versatile guide assembly, assembled into a guide for making arcuate grooves or cuts in a workpiece.

DETAILED DESCRIPTION

Figure 1:
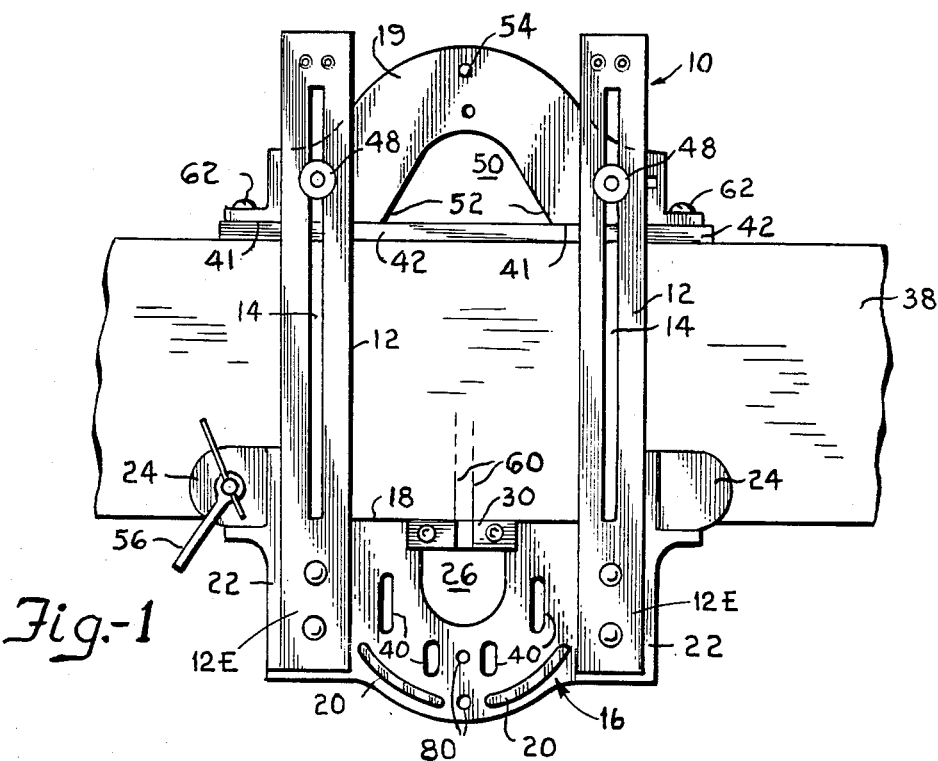
FIG. 1 is a plan view of a versatile guide apparatus constructed in accordance with the present invention shown in use on a workpiece, with the router removed for clarity and the routing path partially shown in dashed lines.

Referring now more particularly to the drawings, and especially FIG. 1 thereof, numeral 10 designates my invention generally. It comprises two guide rails 12 laterally spaced apart and parallel to each other. The rails 12 rest on a wood workpiece 38. A central longitudinal slot 14 is formed in each guide rail, each end thereof terminating short of the distal ends of the guide rails. Corresponding ends of the guide rails 12 are connected to the top of a headpiece or member 16 at the laterally opposing ends. Member 16 comprises a laterally extending straight edge 18, defining the workpiece abutting side of the head member's body and an opposing side near which are mounted stop abutments 20 which serve to limit rearward movement of a router tool.

Stop abutments 20 in router guides 10 for use with the more common round-based routers are arcurate and are concentric with the edges of the bases of such routers. (Alternatively, stop abutments 20 may be formed straight, in line, and parallel to straight edge 18 for rectangular-based routers, or with routers having a combination of straight and curved shapes in their bases).

The laterally opposing ends of head member 16 are formed with raised shoulders 22 longitudinally disposed at right angles to straight edge 18 and each thereof forms an abutment against which the outer sides corresponding ends 12E of the guide rails 12 are seated and braced. These ends 12E are bolted to the top planar surface of the head member 16 so that the straight edge 18 of the body of the head member 16 extends below the bottom surface of the guide rails 12. The parallel space between the guide rails 12 is equal to the diameter or dimension of the router tool with sufficient clearance only to allow the tool's base to slide between the rails and still be constrained thereby to follow a straight line. In order to provide the rigidity required between the head member 16 and the two spaced parallel guide rails 12, the distal ends thereof are releasably connected to a second or rear headpiece or member 19 and the bottom sides of the guide rails 12 are provided with rectangular recesses 12R (FIG. 2) for receiving a mated rectangular upstanding lug 16L formed at each end of the head member body integral therewith (FIGS. 6 and 7) and spaced inwardly from the raised shoulders 22 at each side of the head member 16.

Extending outwardly of shoulders 22 and forwardly of straight edge 18 as well as elevated from the planar body of head member 16 are clamp lugs 24, the bottom surfaces of which are co-planar with the bottom surfaces of guide rails 12. Midway between the laterally spaced guide rails 12, a semi-circular aperture 26 is provided in the body of the head member 16. The aperture 26 is tangentally open through the straight edge (FIG. 7). The central part of the head member 16 forming the straight edge 18 is rectangularly recessed as at 28 and supplemented with a pre-disposed rectangular wood block 30 (FIGS. 10 and 11) by means of depressed cap screws 32 (FIG. 11) fastened in tapped holes 34 (FIGS. 6 and 7) to render it removable and exchangeable. The wood block is furnished with such counter bored holes but is preferably provided without a groove such as the groove 36 shown in FIG. 11, such groove being created by a selected router bit prior to actual workpiece 38 (FIG. 1) routing. Thus the groove formed is an accurately centered, visible facsimile of the router bit's cut, and bearing against the edge of the workpiece, the operator is allowed to position the router guide on the workpiece so that when the groove is aligned with a proposed point of entry indicated on the edge of the workpiece, the resultant router cut will be correctly placed. The semi-circular aperture 26 serves as a cove for the router bit when the router tool is at rest against the abutments 20 which serve as rearward stops for the router tool. Provided also in the head member 16 are relatively large openings 40 to serve as exit passages for sawdust.

The opposite ends of the guide rails 12 are attached to a laterally extending planar rear headpiece member 19 similar to the head member 16 in that it also comprises a straight edge 41 defining the proximate side of the rear member body 19. As explained below a wood straight edge piece 42 may be affixed to this edge 41. One side of the rear member 19 is formed with a broached hole 44 and the laterally opposite side of the rear member 19 is formed with a laterally extending slot 46. The hole 44 and the slot 46 provided in the ends of the rear member 19 are spaced to be aligned with the longitudinal slots 14 of the guide rails 12 to receive therethrough bolts and fingernut connectors 48 to attach the opposite ends of the guide rails on the top side thereof so that the straight edge 41 thereof extends laterally underneath the bottom side of the guide rails 12. By loosening the fingernut/bolt connectors 48 the rear member 19 may be moved longitudinally along the guide rails 12. By utilizing the connector 48 through the hole 44 as a pivot, the rear member may be angularly adjusted to the extent that the length of the slot in the other end of the rear member will allow and the router guide may be connected to a non-paralleled sided workpiece. Similarly, the straight edge 41 side of the rear member 19 is formed with an aperture 50 in the central part thereof, however, the opposite sides of the aperture tangentally extend to the straight edge as at 52 to provide sufficient clearance so that a wide router bit may clear the rear member when said member is adjusted to an angular position. A shaft or stud 54 is fixedly imbedded in the center line of, and near the rear edge of the rear member. That portion of the shaft or stud 54 that extends upwardly above the top surface of the rear member is threaded. One purpose of this shaft is to limit the continued forward movement of the router tool after it has completed its cut and a second function will be explained below.

Figure 2:
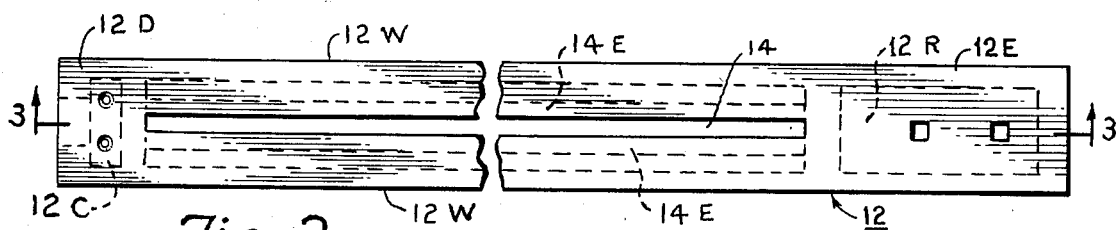
FIG. 2 is a detailed top or plan view of one part, a siderail, of the guide of FIG. 1.
Figure 3:
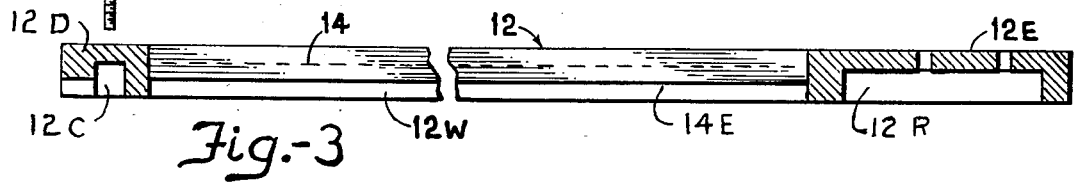
FIG. 3 is a sectional view of the siderail of FIG. 2 as seen from the plane defined by the line 3—3 on that figure when looking in the direction of the arrows.
Figure 4:
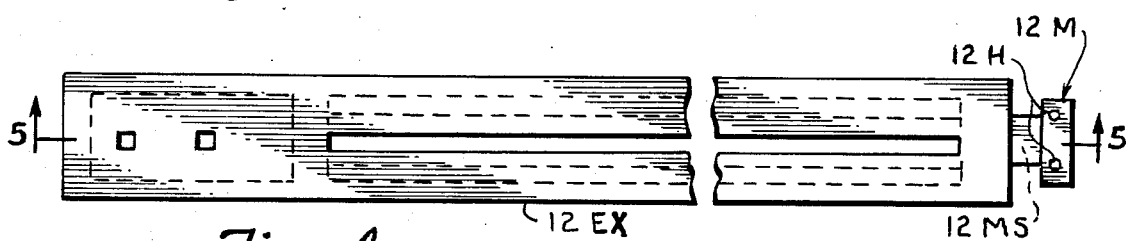
FIG. 4 is a top or plan view similar to that of FIG. 2 of an additional part, an extension unit for the rail of FIGS. 1, 2 and 3.
Figure 5:
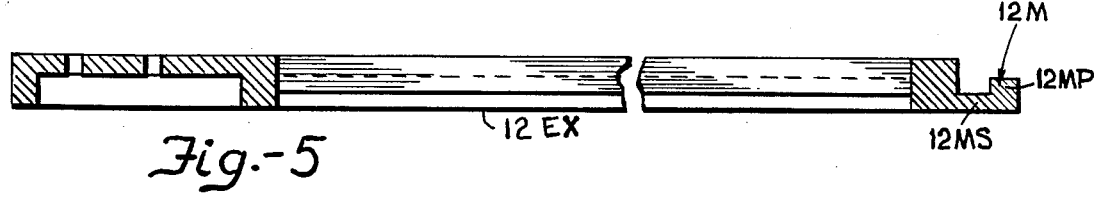
FIG. 5 is a sectional view, similar to that of FIG. 3, of the part of FIG. 4 as seen from the plane of the line 5—5 of FIG. 4 when looking in the direction of the arrows.

As best shown in FIGS. 2 and 3, the bottom edges 14E of the depending longitudinal walls defining the slots 14 in each guide rail 12 terminate at a distance less that to the plane existing between the bottom edges of the opposing outer walls 12W of the guide rails 12. The space below the bottom edges of the dependent longitudinal walls permits the accommodation and movements of various fastening devices for the connection of certain accessories which will be described later. As also best shown in FIGS. 2 and 3, the distal ends 12D of certain paired sets of guide rails 12 are each formed to include a rail extension connector 12C. The connectors 12C are the female cavities for a male connectors shown in other rails 12EX of FIGS. 4 and 5. These male connectors 12M comprise a T-shape link (FIG. 4) wherein the stem 12MS of the T-link extends longitudinally from the bottom part of the guide rail 12EX so that the bottom surface of the stem is co-planar with the bottom surface of the distal end of the guide rail 12. The rectangular cross piece 12MP of the T-link not only projects laterally from each side of the stem but also projects toward the top surface of the guide rail to provide a spaced rectangular lug. The female link connector 12c is formed in the bottom side of a guide rail 12 at the ends 12D and comprises an inverted T-shaped recess into which the male link connector fits tightly when such equipped guide rail is introduced. The coupling is additionally secured with machine screws such as the screw 12S (FIG. 3) which is received in tapped holes 12H (FIG. 4). The top, bottom and side surfaces, respectively, of the two abutted guide rails 12 and 12EX are co-planar. In this manner the guide rails 12 may be longitudinally extended to span a wide workpiece. Pairs of rails are preferably provided in different length categories to facilitate performance on short as well as long dimensioned workpieces.

The router guide 10 of this invention as described heretofore serves to guide a router tool in the forming of full (or through) dadoes across a workpiece, whether the workpiece has parallel or non-parallel sides.

If straight or veining bits are to be used to route the dado or groove, a rectangular wood block 30 is fastened in the headpiece recess 28. The guide of this invention is placed upon a suitable scrap of straight edged wood and the straight edge 18 of the head member is abutted to the wood scrap straight edge. Clamping means such as C-clamps 56 are applied atop clamping lugs 24 and below to the wood scrap to secure the guide to the scrap. The proper size bit is chucked in the router tool and the base of the tool is rested flat on the head member and against the upright stop abutments 20 with the router bit extending a short distance below the top planar surface of the head member 16 and within the cove of the semi-circular aperture 26. Power is applied to the router tool and it is moved forward between the guide rails 12 to complete a cut across the block 30. The power is switched off and the router tool is removed from the guide 10. The block 30 has thus been provided with a groove 36 having the width dimension equal to the diameter of the router bit being used (FIG. 11). The purpose of the groove is to facilitate an accurate positioning of the guide of this invention by means of a close alignment of said groove with the desired point of entry preferably marked on the proximate edge of the workpiece prior to fixing the guide to the workpiece for routing. For every size of straight-profiled router bit, a rectangular wood block may be provided with a corresponding indicator groove in advance of actual need in routing operations. Accordingly, these wood blocks are re-useable when installed and used with bits of proper size.

The procedure for preparing wood blocks that will be used to indicate grooves formed by V-bottomed, round bottomed, dovetailing "and other point forming bits" differs from the preceding method relating to straight bits in the respect that the wooden block 30 is withheld from its position in the head member until after the proposed groove is practiced and proved satisfactory on a wood scrap. The wooden block is then installed and the undisturbed router bit is caused to route the approved indicator groove as it will subsequently appear on the workpiece.

Wood indicator blocks thus formed for V-bottomed and round bottomed bits are re-useable when a newly proposed routing is at least as deep or deeper than the initial groove formed in the block. An indicator block 30 prepared for a dovetail bit can be re-used if the same bit is reset at the original cutting depth—a maneuver easily accomplished by slipping the unmounted block around the chucked, extended dovetail bit and adjusting the router tool until the block seats on the router base. Subsequently, the indicator block is installed while the router setting remains undisturbed.

The latter group of indicator blocks 30 is similarly employed to position the router guide by a visual alignment of the groove with a pair of indexing marks 60 (FIG. 1) on the proximate edge of the workpiece. These marks are simply one-half divisions of the dado's width laid out on each side of the dado center line.

With a prepared indicator block fastened in position in the head member, and a corresponding bit chucked in the router tool, the straight edge of the rear member 41 is provided with an expendable straight edged wood member 42 spanning the aperture in the central part of the rear member. This wood member 42 may be temporarily attached to the rear member by means of round head wood screws 62 passed through the holes 63 located near the opposing ends of the straight edge of the rear member if more than only a small number of router cuts are to be made. The wood member 42 is preferably as thick as the workpiece and is mounted flush with the top of the rear headpiece 19.

Fingernut connectors 48, releasably connecting the rear member 19 to the rails 12 are loosened and the guide of this invention is placed over the workpiece 38 with the straight edge of the head member 16 in contact with the proximate edge of the workpiece 38 as shown in FIG. 1. The guide 10 is slidably moved along this edge to establish correct alignment of the indicator groove of the block 30 and the indexing marks 60 on the workpiece. The clamping means 56 described previously are applied to secure the guide to the workpiece. The straight edge wood member 42 is made to abut the opposite edge of the workpiece and the rear member is then fixed to this position by tightening of the fingernuts 48.

The router tool is positioned atop the head member 16 with its base against the upright stop abutments 20 and with the router bit which had been previously set to a desired depth-of-cut extending into the cove of the semi-circular aperture 26. Power is applied and the router tool is advanced forward between the guide rails 12 until the routing cut is completed across the workpiece and either partially or fully through the wood member 42 abutting the distal edge of the workpiece. At this point the movement is stopped and power switched off and the router is removed from the guide. The purpose of causing the wood straight edge 42 to bear closely to the edge of the workpiece at the point of exit of the router bit is to prevent, as much as possible, splintering of the wood which is normally the unprevented condition at that point. The corresponding point in the abutted straight edge strip 42 is effective so long as the same bit is used at its original or lower depth setting. The same point in the wood strip is effective in purpose when subsequently larger bits are employed. An undisturbed portion of the wood strip is made to abut a router exit point by laterally re-positioning it on the rear member when desirable. Eventually, the wood strip is disposed of.

In the process of routing dadoes wherein a tapered side is present in the workpiece, the rear member is made to abut the tapered edge at that particular angle while the routing takes place as herein above described.

STOP DEVICES—REAR STOP

Several attachments are provided to enable the guide 10 to constrain the movement of the router tool when it is desired to make half-blind and fully blinded dadoes.

As best shown in FIG. 12, I provide a rear stop member 68 which may be used independently of the other constraint attachments in forming half-blind dadoes. More than one rear member stop may be provided, each differing only in length but similar in all other respects as described here. The rear stop member 68 is preferably a red rectangular bar having a central slot 68S longitudinally thereof extending to near each end. When the half-blind dado occurs on a parallel sided workpiece, the stop is attached in the center line of the rear member, and it follows, will be directly in the router's line-of-cut. Spaced forward of the fixed and threaded shaft 54, and located in the center line of the rear member 19 is a threaded hole 70 for receiving a shouldered finger bolt 72. The threaded shaft 54 and an introduced finger bolt 72 both passing through the rear stop's longitudinal slot causes, the stop to be slidably adjustable in the router tool's line-of-cut. When the rear stop is properly adjusted, the finger bolt 72 is tightened to fix the stop 68 in that position. (The wood member 42 is not required while routing blinded dadoes).

Preferably, an accurate representation of the proposed half-blind dado is laid out on the workpiece and includes the longitudinal center line of the dado, its actual terminating point and its width which is indicated by indexing marks on the proximate edge of the workpiece. The proper indicator block 30 is installed in the head member 16 and the guide of this invention, subsequent to its alignment with the indexing marks, is fixed by clamping means to the workpiece. The rear member 19 is abutted against the opposite side of the workpiece. The proximate end of the rear stop 68 is made to exactly fall upon a "router offset point" which is located on the center line beyond and measured from the laid-out dado terminus. (The measurement for the router offset point is consistently equal to the difference between the radius of the bit and the radius of the router base). The rear stop is fixed by tightening the finger bolt 72 and the router tool is in normal fashion, then advanced up to the offset point where its base encounters the stop and the half-blind dado is completed.

To repeat this dado elsewhere on the workpiece, it is usually sufficient merely to remove the clamp(s) 56 and slide the guide 10 to a new dado location which requires only indexing marks for proper guide alignment. If, for whatever reason, the rear member 19 is released, the rear stop setting remains valid—if undisturbed when the rear member is again abutted against the same or like workpiece.

When a stopped dado is required in a workpiece in which the far side is tapered, the finger bolt 72 is removed from the rear member 19 and a fingernut 55 is threaded onto the upright shaft 54. As before a layout is created on the workpiece and the guide 10 is aligned and clamped. The rear member 19 is abutted against the tapered side of the workpiece and fixed there. The rear stop 68 is pivotable around the shaft as its near end is directed toward and moved to encounter the measured router offset point described previously. The routing is executed, and after this initial routing an undisturbed rear stop setting will allow subsequent routings wherein the blinding-point in each will occur the same distance away from the tapered edge although the rear member 19 of necessity must be released and moved in order to occupy a new position on the taper. The rear stop 68 must be re-adjusted in other situations.

As shown in FIG. 13, a head stop attachment 74 is provided with the guide 10. Although it may be similarly, but less practically, employed independently to make a half-blind dado, a greater use for it is in association with the rear stop 68 in forming a single fully-blind dado across the workpiece. The head stop 74 is an elongated rectangular bar of transparent material having a forward end formed with an upstanding projection 76. The projection 76 is preferably colored green. The bar of the head stop 74 is provided with a longitudinal central slot 75 which extends from adjacent the rear end to adjacent the upstanding projection 76. The head stop 74 is attached to the head member 16 in the center line of the head member 16. The connecting means are two shouldered finger or thumb bolts 78 passing through the center slot 75 of the stop 74 and threading into threaded holes 80 provided in the center line of the head member (FIGS. 1 and 6). The head stop 74 adjustment to a router offset point is similar to the procedure prescribed for the rear stop, and tightening the finger bolts 78 fixes the stop's position.

The manner of forming a fully-blind dado is commenced with the customary layout showing both ends of the dado, the alignment and fixing of the guide and the adjustment and fixing of rear and head stops to their respective router offset points. The dado cut is started by guiding the side of the router tool's base against the forward surface of the elevated projection in the performance of a plunge cut. The router is moved forward until it encounters the rear stop at which point the dado is again blinded. Routers equipped for plunge cutting, of course, do not require the initial cutting maneuver.

This fully-blind dado is repeatable elsewhere if the workpiece is parallel-sided, and the new dado location needs only indexing marks on the proximate workpiece edge to insure alignment of the guide. The transparency of the head stop will allow the viewing of such alignment even though it may be situated directly above the groove indicator block 30. Further, the rear member 19 may be released from its position and returned without affecting the accuracy of the setting.

Frequently, blinding points of blind dadoes are required to occur very near the edge of a workpiece than elsewhere upon it. Consequently, the router offset point will lie beyond the boundaries of the workpiece and this point cannot be plotted but must be located by means such as a straight rule extended from the workpiece.

A stop gauge 84 (FIG. 14), is provided for use with the constraining attachments 68 and 74 of this guide 10 which allows accurate placement of these stops in relation to the router offset point, whether that point lies within the workpiece boundaries or beyond them. The stop gauge 84 is T-shaped in plan. The leg 85 of the stop gauge 84 is made of transparent material. The lateral member 86 which forms the top of the T-shape is connected to the end of the leg 85 or stem so that its planar surface is perpendicular to the stem. The distance from the end of the transparent stem 85 to the far surface of the lateral member 86 is equal to the distance from the edge of the router's base to its center point. Graduations 88 are impressed on the bottom surface of the stem and are used in establishing the router offset.

The use of the stop gauge with the rear stop 68 or head stop 74 is generally similar, and is herewith described. With a representative layout of the proposed dado having been made on the workpiece as described before, and the guide correctly aligned and fixed, the transparent stem of the stop gauge is placed over the plotted blinding point and the graduation mark equal to the radius of the router bit is made to coincide with the marked blinding point. As the gauge 84 is held with its lateral member 86 perpendicular to the guide rails 12 the rear or head stop is adjusted to abut the far vertical surface of the gauge's lateral member and is there fixed. By having thus compensated for the router bit radius, the completed dado will terminate at the plotted blinding point.

Again by employing the rear and head stops 68, 74 jointly, it is possible also to route two (or more) relatively short in-line fully-blind dadoes in narrow, parallel-sided workpiece stock; for example 2×4 lumber.

The guide 10 is generally prepared as previously described, and the rear and head stops 68, 74 are adjusted and fixed to their respective router offset points as related to the first of the dadoes under consideration. The first dado is cut, and if identical dadoes are desired, the guide is moved to their locations as shown by indexing marks on the workpiece and they are there performed. Then the guide is returned to the original location where the rear and head stops 68, 74 are re-adjusted to their respective router offset points relating to the second dado. After this dado is cut, the guide may be moved to the various locations to complete each series of dadoes.

STOP FENCES

Stop fences or bridges 90 (FIG. 14) are provided to establish router offset points which either the rear stop 68 or head stop 74 are not capable of reaching. Moreover, a pair of stop fences or bridges 90 may be used coincidentally with both the rear stop and head stop to make two or more in-line, fully-blind dadoes.

Two stop fences 90 are sufficient to complete any number of in-line dadoes that might be required. One fence is preferably colored green, the other red, but in all other respects they are identical. The stop fence 90 comprises a bar generally rectangular in shape, the body thereof extending slidably between the inner sides of the spaced rails. Adjacent each end of the top part of the fence is a depending runner 91 which fits slidably into the respective slot of the guide rails. A vertical hole 92 is formed through each end extending through each depending runner. The purpose of these holes will be shown later. The fence 90 is also provided with a horizontal hole 93 centered in the body thereof to receive a plug member 94 of the stop gauge 84 for a temporary union of the two units for the purpose of establishing router offset points for the stop fences 90.

Retainer buttons are vital to the function of stop fences after the fences have been positioned at router offset points. A pair of retainer buttons is required at each router offset in certain blind-routing operations, and to identify their particular purpose in those operations, pairs of buttons are colored either green or red accordingly. The reason for color coding becomes apparent when the operation is later described. Several pairs of buttons are provided with the guide.

Typically, a retainer button is a modified nut and bolt assembly in which the head is a transverse bar of a width which may pass through the guide rail slot, when positioned parallel thereto, and of a length which spans the bottom side of the slot walls when positioned transversely of the slot. The round shaft of the bolt is perpendicular to the head and its upper part is provided with threads whereupon a colored, substantially sized knurled fingernut is threaded. The top end of the shaft is provided with a like-colored vertically swivelable directional flag or pennant having a direction which corresponds with the direction of the head. The nut is adjusted to position the depth of the head below the bottom side of the walls of the rail slot, and the pennant is manipulated to position the direction of the head to extend across the bottom of the slot walls upon which the head may be fixed where desired by tightening the nut.

The space provided below the walls of the slot is sufficient to accommodate the head of the bolt whether it is in the fixed state, or loosened to the extent that the retainer button may be slidably adjusted longitudinally in the rail slot.

The joint assembly of stop gauge 84 and fence 90 is placed between the rails 12 of the guide 10 which has been fixed after alignment to the customary pre-drawn layout of the dado/dadoes on the workpiece. The fence or bridge 90 is placed away from the dado blinding and the stem 85 of the gauge 84 is directed toward it. The graduation of the transparent gauge stem corresponding to the radius of the bit is made to coincide with the marked dado blinding point. While the assembly is positioned thus, a retainer "button" unit 96 (FIG. 16) is introduced to the slot 14 in each opposing guide rail 12 and brought to abut against the side of the stop fence 90 opposite that side in union with the gauge 84. Then, each retainer button 96, by fastening means existent within, is fixed in position in the respective rail slot 14.

As stated before, the stop gauge 84 is representative of the radius of the router base, and it is apparent that if the gauge 84 is removed from the fence, the base of the operating router tool in an encounter with the fence will cause its bit to rout a blind coincidental with the pre-drawn blinding point.

Accordingly, a fully-blind dado may be commenced by employing a plunge cut while the router base encounters one fence 90; and it (dado) may be completed by the router base's encounter with a second fence 90.

Moreover, if retainer buttons 96 are not disturbed, a stop fence may be removed from the guide rails 12 and later returned to abut the buttons in the same arrangement without affecting the accuracy of a subsequently routed dado blinding.

A series of as many in-line, fully-blind dadoes as are desired may be made in a singular manner by means of this guide 10 in company with the constraint devices described heretofore.

The guide 10 is ultimately fixed generally as before to the workpiece. The dado on the workpiece nearest the head member is considered first, and its near router offset point is established by the stop gauge/head stop alliance. The dado's distant router offset point is established with the stop gauge/stop fence union and then retainer buttons are fixed against the fence at each rail slot. The gauge 84 may be removed from the fence 90, likewise the second provided fence 90 may be substituted to abut the fixed retainer buttons 96. Routing of the dado is commenced by a plunge cut against the head stop and is completed with the router's encounter with the stop fence 90 which is buttressed by the buttons 96. The fence 90 is removed from the rails 12 and the buttons are loosened sufficiently to allow them to slide along the slots 14.

The router offset points of the second dado are both established with the stop gauge/stop fence union and an additional pair of retainer buttons are required to buttress the two fences. Again, the dado is commenced by a plunge cut and completed against the far fence. The fences 90 are removed and the buttons 96 loosened.

All interiorly located dadoes are continued to be made in similar fashion until the final dado. Here, the near router offset consists of a fence, while the rear stop serves as the last router offset.

If two pairs of rails 12 and 12E have been linked to form an extended rail assembly, the possibility exists that either the fence or its buttons will be dictated to be situated at the location of the linkage devices where no slot is formed to receive them. In this contingency, the normal router offset may be strategically further increased and a shop-furnished wood block placed against the reset fence and between the guide rails to compensate for the offset.

REPEATABLE BLIND DADOES

A series of two or more fully-blind dadoes which may be duplicated on the same, or like, parallel sided workpiece is possible by means of the guide 10 and its constraint devices, provided, however, that the length of the shortest dado in the series is not less than two-thirds the dimension of the router base as measured along the longitudinal axis of the guide if the router were present there.

All preparatory measures having been made generally as described previously, the manner of routing this particular series proceeds thus:

The head stop is established as the router offset for commencement of the first dado. The head stop's green color is associated with the commencement, or "start" of this and all the other dadoes. The router offset point for the opposite end of the first dado is established with the stop gauge/stop fence union, and a pair of red retainer buttons is fixed against the fence. The color red is hereafter associated with the completion, or "ending" of a dado.

The gauge/fence union is used to establish the start of the second dado, and a pair of green buttons 96 is fixed against the fence. The ending of the dado is likewise established with the gauge/fence union and red buttons 96 are fixed against the fence. All subsequent interior dadoes are treated in similar manner.

The start of the last dado in the series is established with the gauge/fence union and green buttons are fixed. The ending of the dado is established with the red colored rear stop. The stop gauge and fence may now be separated.

The red fence 90 is positioned against the first (or near) pair of red buttons 96 and the first dado is cut by movement of the router from the head stop to the red fence 90 after which the fence 90 is removed for re-positioning.

The sequential routing between the spaced green colored and red colored stop accessories complete the series of dadoes.

The fixed retainer buttons will allow this series of dadoes to be produced elsewhere on the workpiece.

FLOORLESS ROUTER CRADLE

Figure 17:
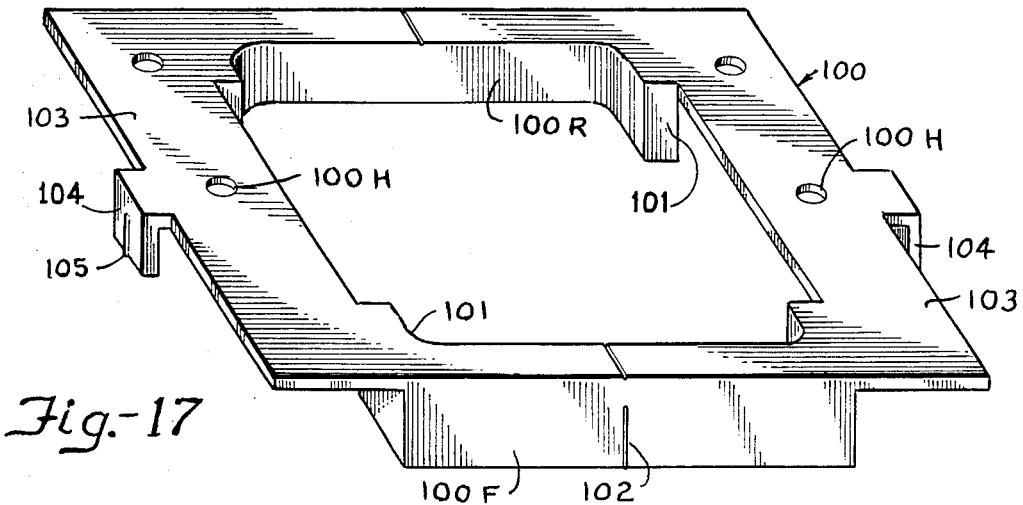
FIG. 17 is a perspective view of an additional part for the guide apparatus, namely a cradle for a router.
Figure 20:
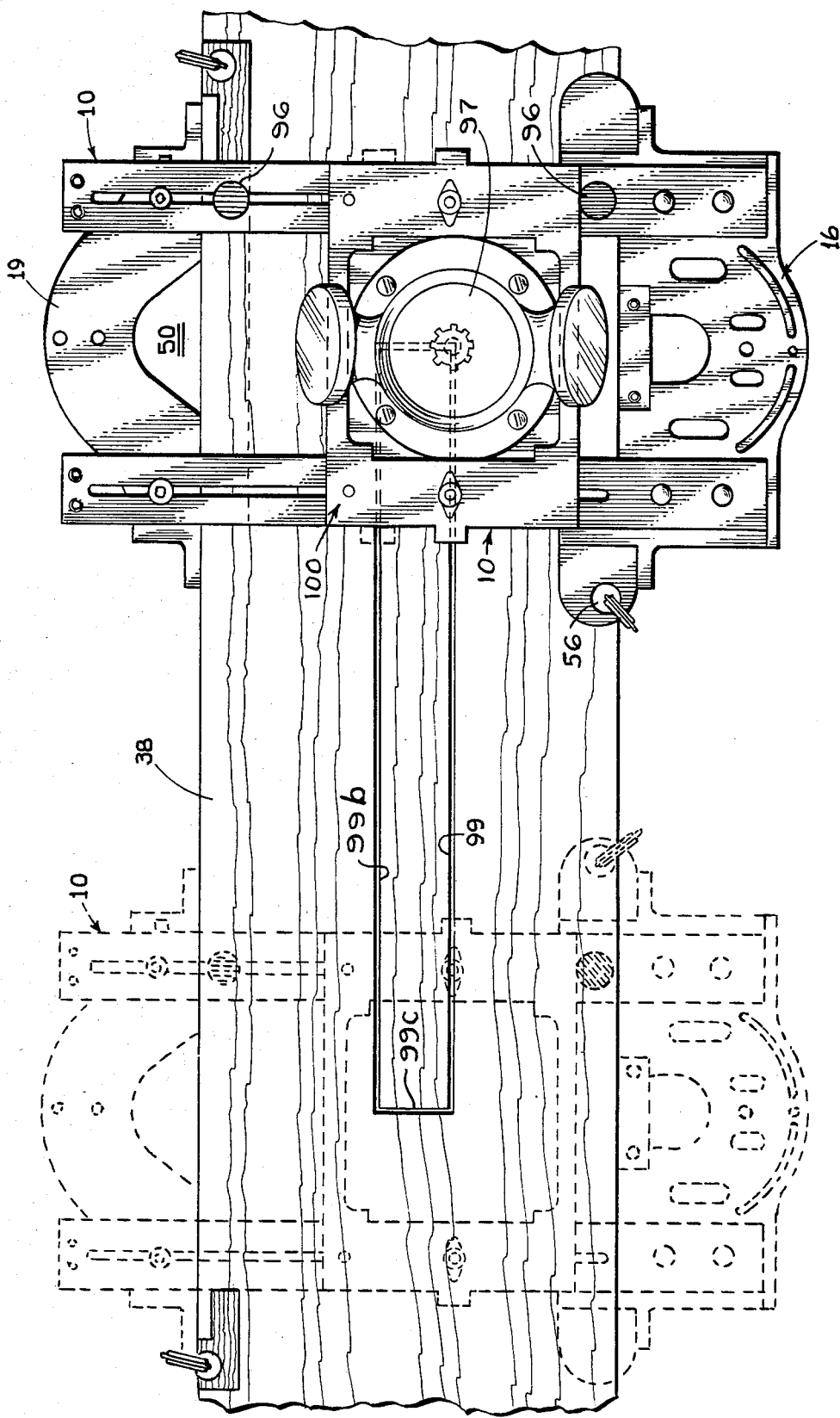
FIG. 20 is a plan view of the guide assembly, including the parts of FIGS. 16 to 18 illustrating its use in forming a rectilinear groove in a workpiece.

Another accessory that is provided for the router guide 10 of this invention is a floorless router cradle 100 that is shown in FIGS. 17 and 20. The absence of a floor allows the router base to be in direct contact with the workpiece surface thereby permitting a more uniform depth of cut when the workpiece is slightly warped. The absence of a floor also lessens friction and reduces the accumulation of sawdust in the cradle. The floorless router cradle 100 comprises a rectangular frame. At two opposing sides referred to as front and rear, are depending walls 100F and 100R, the bottom edges of which are nearly flush with the bottom side of the guide rails so that a small clearance is provided between the bottom edge of the depending walls and the workpiece surface. The distance between walls is equal to the router diameter, as shown in FIG. 20 with a slight clearance for ease of inserting the router 97 therein. The ends of the depending walls 100F, 100R inserting the router 97 therein fit within the spaced guide rails 12 confined therebetween with only sufficient clearance to permit sliding movement along the guide rails. The inside surfaces of the depending walls 100F, 100R near their ends are formed with a radius which terminates at a point spaced from the inner sides of the guide rails 12 such as at 101. I also provide vertical scribes 102 on the front and rear sides of the cradle, each in alignment with the guide's longitudinal center line. The top surfaces of the cradle's front and rear sides are embossed or inscribed laterally with a printed line indicating the distance from the outer edge of the side to the transverse center line of the cradle.

The other opposing sides of the rectangular frame, referred to as flanges 103, extend over the top surface of the guide rails and thereby support the cradle between the guide rails 12. Projections 104, which extend outwardly and downwardly from the center of the flanges 103 are each scribed with a vertical mark 105 which serves as an indexing point. These vertical index marks are aligned with the transverse center line of the cradle.

When the cradle's use is required, it is connected to the guide rails by means of a pair of cradle fasteners 106 (FIG. 18) which is normally in the presence of the opposing flanges at all times. The heads 106H of the fasteners are passed through the slots of the rails and when turned in a 90 degree direction span across the bottom of the recessed walls of the slot.

Figure 18:
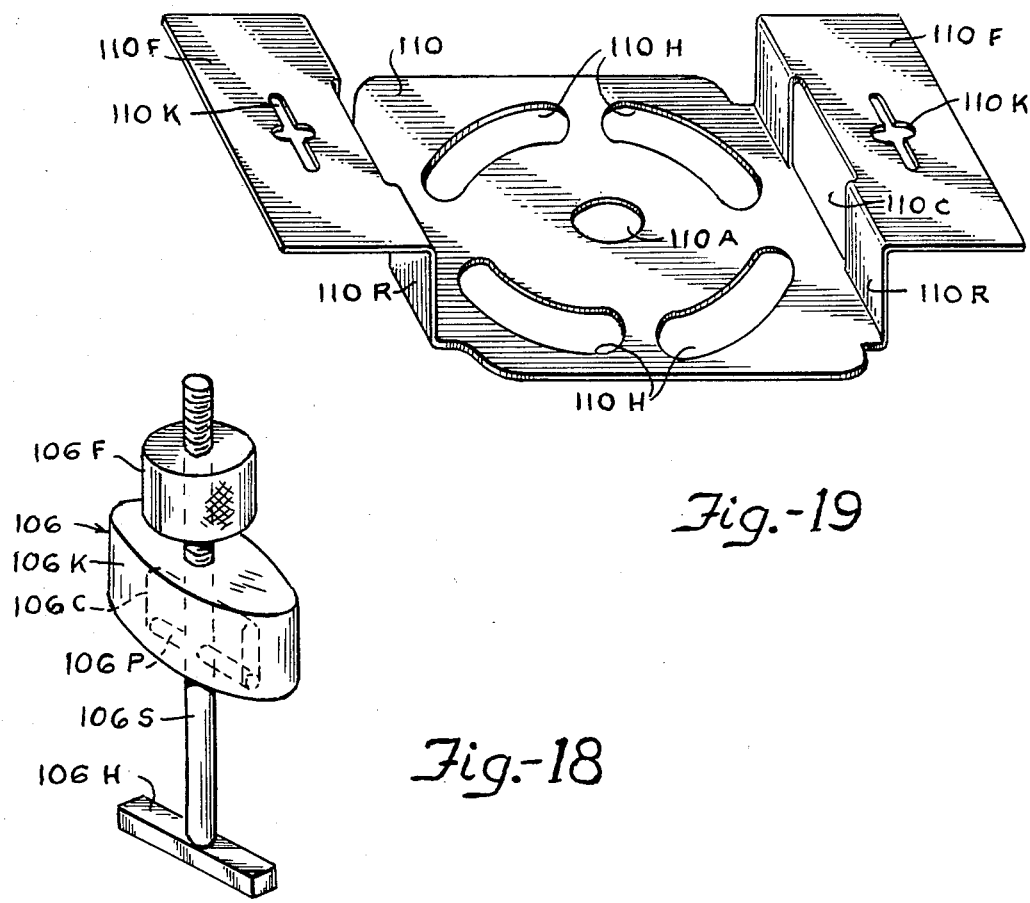
FIG. 18 is a perspective view of another additional part of FIG. 17, namely a cradle fastener with internal parts shown in phantom lines.

Holes 100H are provided in the flanges on the transverse center line of the cradle 100 in such a manner that the center point of each fastener is situated over the center line of the slot 14 in each fixed guide rail 12. As best shown in FIG. 18, the shaft 106S of a cradle fastener 106, passes through said hole and extends above and below the horizontal flange 63.

Each cradle fastener 106 comprises a central shaft 106S whose diameter is slightly less than the width of rail slot 14. The head 106H of the fastener is a rectangular bar fixedly attached at its center to the bottom of the shaft in a perpendicular relation.

The width of the head 106H is equal to the diameter of the shaft, and its length is sufficient to span the opposing walls of rail slots 14 as stated. The upper lateral edges of the head 106H are slightly rounded to within a very short distance of the shaft.

A cross-hole 106C is spaced higher along the shaft, and in relation to the cradle, the hole is located above the horizontal flange 103. The horizontal axis of the hole lies in the direction of the long axis of the head at the bottom of the shaft. The cross-hole is supplied with a round, removable pin 106P.

An elongated knob 106K roughly described as an ellipse which is pointed at its narrow ends, is provided with a centered vertical through hole slightly larger in diameter than the shaft of the fastener. Slots are formed in the bottom side of the knob on each side of the hole in the direction of the long axis of the knob, and these slots extend deep into the knob. This slot is formed to receive the pin 106P in the shaft. When the knob 106K is in place on the shaft, the slot functions as a slidable keyway for the pin during the upward or downward movement of the shaft in relation to the knob.

The upper portion of the shaft is provided with threads, and a shouldered, knurled fingernut 106F is screwed thereupon.

When both fasteners are in their normal company with the cradle, both fingernuts 106F are backed off and long axes of both knobs 106K are pointed parallel to the rail slots 14 and thereby permit the shaft heads to enter the slots for attachment of the cradle to the guide, and likewise, for removal. The knobs 106F are then pointed perpendicular to the rails thereby causing the heads to span across the bottom of the slot walls, and when it is desired to lock the cradle at a given point on the rails, the fingernuts are tightened while the knobs are held steadfast. If the cradle 100 is required to be slidably moved along the rails, the fingernuts are backed off sufficiently enough to allow the movement.

The cradle 100 may be attached to the basic router guide to rout parallel-to-the-edge grooves in workpieces with well machined, parallel opposing sides, although no groove may be formed in the very proximate edges of said sides. The limit is imposed by the structural nature of the cradle.

To rout a groove beyond the limit, the router guide's head and rear members are abutted to the opposing sides of the workpiece and the rear member fixed to the rails. The cradle is accurately positioned by the aligning of a vertical scribe on one of its cradle flange projections with the mark of a proposed groove's center line. The cradle 100 is locked to the rails in that position by means of the cradle fasteners. The router tool is placed within the cradle and made to rout the groove by moving it and the guide along the workpiece.

By virtue of the guide's simultaneous abutment to two sides of the workpiece, rather than only one, the line-of-cut is assuredly straight.

To blind a groove, the point of blinding is marked, and the vertical scribe on either the front or rear side of the cradle is aligned with it. While the cradle is in position the operator furnishes a stop block to abut the appropriate lateral side of the guide. Similarly, an opposing blind may be made in the groove. All grooves routed will be similar in length.

With the cradle 100 attached to the basic guide and the additional use of retainer buttons, it is possible to rout fully-blind dadoes on a workpiece, but the proximity of the blinding points to the front and rear edges of the workpiece is also limited as noted before.

The blinding points are marked on the workpiece. The point nearer the operator is aligned with the scribe on the lateral center line of the cradle and a retainer button is fixed in front of the cradle. The cradle is moved to the opposing blinding point for alignment and a button is fixed behind the cradle. The limits to the length of the dado now fixed, the guide is positioned on the longitudinal center line of the dado by the witness of an alignment of the scribe in either the front or rear side of the cradle with the dado center line. The guide is fixed to that position by clamping means upon the clamping lugs. The cradle is returned to the near button and the router commences the cut there and completes it when the cradle encounters the other button. This type of dado is unimportant of itself and rarely used.

The cradle routed dado, however is used in combination with the grooving operations aforementioned in the forming of slots, rectangular cut-outs, inlay recesses, etc., on a parallel sided workpiece of unrestricted length, while allowing the workpiece to remain immobile, which in many cases is advantageous.

Briefly stated, the manner in which the two operations are combined in making a basic rectangular cut-out is thus:

A layout is generally made on the workpiece and its lines may be extended for convenience in alignment. The guide is centrally aligned with the dado which forms the left side of the rectangle, and a stop block is fixed abutting the left side of the guide, thereby establishing one extent of the rectangle. The guide is moved to the right dado and centrally aligned with it. A stop block is fixed abutting the right side of the guide, thereby establishing the length of the rectangle.

Now the cradle is aligned laterally with the near groove and a button is fixed in front of it. The far groove is aligned with the cradle and a button is fixed behind it, and now the width of the rectangle is also established. When routing the dadoes, the guide is clamped to the workpiece while the cradle is moved. When the grooves are routed, the cradle is locked to the rails by its fasteners as the entire guide is moved.

Figure 19:
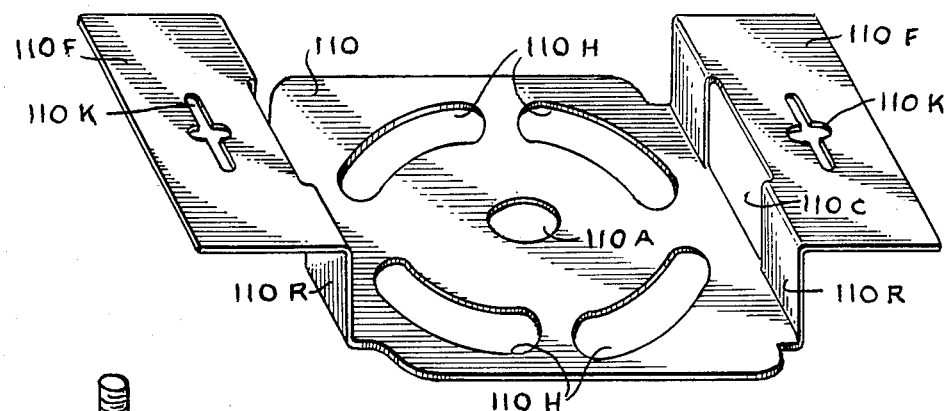
FIG. 19 is a perspective view of an optional attachment, an auxiliary floor member that can be used with the cradle of FIG. 17.

When the cradle is used during router excavation of large areas, an auxiliary floor 110 (FIG. 19) may be attached to the cradle to prevent the router from tilting and causing the bit to gouge the workpiece. The auxiliary floor 110 is formed from thin rigid material. The central part is rectangular in plan and dimensioned and shaped to fit within the opening of the cradle. A central aperture 110A is provided in the central part of the floor through which the router bit extends. I provide additional apertures 110H regularly spaced around the central aperture to lessen sawdust accumulation.

Rectangular areas 110R adjoin the laterally opposing sides of the floor. Each rectangular area is formed upwardly at the juncture with the floor and is continued a distance and is then formed outwardly at 110F over the top horizontal surface of the cradle flange 103. A centered rectangular opening 110C is provided in each upwardly extending section 110R. The opening borders on each bend formation and extends laterally to within a short distance of each end of the section, the remaining portions thereof functioning as upright connective legs between the horizontal floor and horizontal flange-related section. These openings 110C are required to allow the base of the router tool to engage the sides of the guide rails 12 when both the cradle 100 and its auxiliary floor 110 are attached to the guide rails 12.

The formation of the spaced bends is such that the floor is in the same plane with the bottom surface of the cradle 100 when the horizontally formed sections 110F are resting on the cradle flanges 103. These flange-related sections 110F are provided with keyholes 110K which are in alignment with the center points of the cradle fasteners. In order to attach the auxiliary floor to the cradle, the knurled fingernuts and direction knobs are removed from the fasteners, and the pins (or keys) thereon are oriented longitudinally. The auxiliary floor 110 is placed in the cradle 100 and the knobs 106 and fingernuts 106F are returned. The passive and locking functions of the fasteners 106 are unaffected.

In the operation of the router guide 10 with the accessories removed (FIG. 1) the basic router guide 10 comprises the guide rails 12, the fixed head member 16 and the rear member 19 which may be longitudinally moved along the rails and positioned to accommodate the opposite edges of the workpiece, whether parallel or at an angle, and the headpiece containing a rectangular wood block 30 having the bit entry indicating groove which has a width equal to the diameter of the router bit in use. Further, the straight edge 41 of the rear member 19 carries an expendable straight edged wood strip 42 to prevent splintering of the edge of the workpiece when a through dado cut is made. The base of the router tool is placed on the head member 16 preparatory to making a through dado in the workpiece after the guide of this invention is securely clamped onto the workpiece with the straight edges of the head member and rear member fixed against the oppposing sides of the workpiece. The router tool may then be guided across the workpiece to form the desired dado.

As described above, adding the rear stop allows formation of a half-blind dado in the workpiece. Adding the head stop to the head member allows the formation of a fully-blind dado by limiting the movement of the router tool between the in-line constraints of the ends of the stops. Adding the stop fences and retaining buttons allows the formation of a series of in-line blinded dadoes either singular or repeatable or a single fully-blind dado in a location of the workpiece inaccessible to the constraint of either or both rear or head stops.

The purpose and use of the stop gauge, as described above, being for the purpose of adjusting the position of the various constraint devices to compensate for the radius of the bit as well as the router base.

All this is illustrated in FIG. 20 wherein a rectilinear groove 99 in a workpiece 38 is cut by router 97 mounted in cradle 100. The guide 10 (solid lines) is first clamped (clamp 56) in place and the "buttons" 96 affixed to limit its travel and the first section 99A of the groove cut. The cradle 100 is then locked in its upper position and the guide 10 unclamped (Clamp 56 removed) and the entire guide 10 and router 97 is moved laterally to the position shown in phantom lines to thus cut the groove section 99b. The guide 10 is then re-clamped and the cradle unlocked and moved down to cut the groove section 99C. The cradle is then re-locked in place and the guide 10 unclamped and moved back to the original (solid lines) position to complete the cut 99.

CIRCLE ROUTING GUIDE

Certain member parts of the router guide when in the company of other provided parts, not yet described, may be assembled to enable them collectively to function as a circle routing guide. Said circle routing guide is a convenient means to cut inside and outside diameters, to rout concentric grooves and to control the width of expansive grooves by the use of preset limiting stops, as well as to rout radial lines which may be stopped at predetermined points.

Some or all of these operations may be performed by conventional circle guides or shop made devices. More important to woodshop practice, I provide a circle routing guide capable of performing these same operations in a manner which discreetly eliminates the need for a central pivot hole in the workpiece when such a hole is undesirable.

This circle routing guide as shown in FIG. 24 consists of a corresponding pair of guide rails 12 which are caused to be spaced and parallel by the two stop fences or bridges 90 which are positioned in the extreme ends of the slots in the rails. The depending runners of the fences assure the integrity of the spacing of the rails. The bridging fences are fastened to the rails by carriage head bolts 120 which are taken from the head member and are passed through the rail slots and into the vertical holes 92 provided near the opposing ends of the fences. Wing nuts 122 are tightened to bear upon the fences.

The space provided between the rails permits a router tool to be guided there in a straight path; likewise, when the cradle is brought into the rails it will be accommodated in the same manner as when in the basic guide.

I provide a pivot hitch 130 (FIGS. 21, 23) which is attached to the longitudinal center line of the guide and is the means by which the guide is connected to a pivot located on the workpiece. The pivot may be an imbedded nail or dowel, or it may be the pedestal pivot 140 (FIGS. 22, 23) which is provided with the guide, and does not require a hole to be made in the workpiece.

The body of the pivot hitch 130 is L-shaped in section, and the vertical member of the ell, hereinafter referred to as the vertical flange 132, is rectangular in shape and its height is equal to that of a stop fence 90. The center of the vertical flange has a through hole which is threaded to receive the knurled finger bolt 134. The hitch is attached to the guide by passing the bolt 134 through the central horizontal hole 93 in a stop fence 90 and connecting it to the threaded hole in the vertical flange 136 which is positioned against the opposite side of the fence 90. The hitch is now in the long centerline of the guide. The horizontal member of the ell, referred to as the horizontal flange 136, is positioned upwardly parallel to the workpiece during the attachment just described if the hitch is to be used with the provided pedestal point 140, and, alternatively, it is positioned flat to the workpiece when used with imbedded pivots.

The horizontal flange 136 shares a common length with the vertical flange 132 at the joint of the ell whereupon each side of the horizontal flange is of an equal radius inwardly and then formed parallel one to the other in a plane perpendicular to the ell-joint. On the center line of this flange 136 two holes 137, 138 of divergent diameter are formed. The small diameter hole 137 is located nearer to the vertical flange, and accommodates nails or pins which may be used as guide pivots, while the larger diametered hole 138 is spaced away from the vertical flange so as to allow union with the pedestal pivot 140. The diameter of this hole will also accommodate a stock size dowel which may be used as an imbedded guide pivot.

A shop practice to obviate workpiece pivot holes has been to glue a wood block to the surface of the work and then to sink or drive the pivot therein. Accordingly, if a preliminary layout is a requirement, it is difficult to center the pivot point accurately in the substitute surface in respect to the layout. Further, this practice requires compensating for the distance the guide device is raised above the work surface in order to liken it to the raised pivot, and usually the remedy is the addition of blocks below the guide device. Subsequent to fulfilling these requirements and completing the routing, the block must be removed. As the glue joint is frequently bonded stronger than the wood, separation is not always complete thereby necessitating scraping or chiseling of the workpiece surface.

The pivot hitch 130 and pedestal pivot 140 of the circle routing guide of this invention provide the means to rout a circle, or certain of its parts in the absence of a pivot penetration of the workpiece, and furthermore, these means are not extraordinary to the normal performance of the guide nor do they cause damage to the workpiece.

The pedestal pivot 140 is a three dimensioned cylinder formed from a hard, liquid impenetrable material. The bottom of the flange formed on the cylinder's greatest dimension is flat and its edges slightly chamfered. The shoulder 142 formed on the top of the cylinder's intermediate dimension is in a plane slightly below the bottom surface of the horizontal flange 144 of the pivot hitch when it is upended for connection to the pedestal pivot. The smallest diameter formed, the pivot 143 is only slightly less in diameter than the larger hole 138 in the horizontal flange 136. Its top is deeply center punched 145.

The circumference of the bottom flange 144 is divided in quadrants, the points of which are scribed at 146 deeply in the side of the flange 144. The scribings are index marks for the purpose of centering the pedestal to the center of a prepared layout when required.

BONDING PADS—POSITIONING PEDESTAL

Round bonding pads 150 (FIGS. 22 and 22a) may be provided with the guide, and are for the purpose of establishing the pedestal pivot upon the workpiece to serve as the pivot around which the guide rotates. The diameter of each pad is slightly less than that of the pedestal s flange 144. The pad 150 is composed of an absorbent, fibrously separable material. One side of the pad is prepared with a bonding agent 150A which enables that side of the pad to adhere firmly to the bottom of the flange 144 and it is placed there. This agent is preferably covered by a release paper 150R. The opposite side of the pad 150, receives another bonding agent (such as carpenter's glue) capable of causing cohesion of that portion of the pad with a wooden surface.

Thus prepared, the pedestal pivot is positioned on the workpiece. In the event that the pedestal pivot is to be centered in a prepared layout, the center point of the layout is furnished with perpendicular center lines. Each index mark on the flange is made to align with a corresponding cross-line and thus the pivot is accurately established in the layout center.

OPERATION

After the pivot has served its particular purpose, the pedestal is separated from the workpiece by forcing a sharp edged instrument below the chamfer in the flange. Portions of the pad 150 remaining on the bottom of the pedestal are removed with appropriate solvent, while those portions remaining on the workpiece are removed by rubbing with a water-dampened cloth. The pedestal pivot 140 is re-useable.

In FIG. 24 the pedestal pivot 140 is established on the workpiece and the circle routing guide has been connected to it via the hitch 130. The cradle 100 is in the guide. A simple calculation involving two factors (1) the known distance from the side of the cradle to its center and (2) the distance measured from the center punch mark 145 on the pivot to the near side of the cradle allows the operator to position a routing point where desired. The cradle is secured at this point by means of the cradle fasteners 106, and the routing of a circle is made. A wide groove or excavation can be performed by first establishing the point of one of its sides and abutting a retainer button against the appropriate side of the cradle, and in turn similarly fixing a limit for the opposing side of the groove. The cradle fasteners may be made passive throughout routing of the entire area by sections; or more workmanlike, overlapping, concentric grooves may be made with the cradle "locked" during each successive routing. The auxiliary floor may be used during excavation of large areas to prevent gouging. Routings may not be performed closer to the center of the workpiece than to the extent that the apparatus permits and general of guides in this category.

This limitation applies also to radial lines which are more commonly routed by the router tool solely. Clamping means are required to secure the guide to the workpiece after an alignment of the line's vector direction is made with the indexing mark on either the front or rear side of the cradle.

However, positioned retainer buttons spaced to engage the cradle may be used to make stopped radial lines. In this operation the hitch is secured to the fence closer to the linkage related end of the guide rails. A pair of guide rails equipped with the opposite linkage gender is mated to the rails of the guide, and by so doing extend over the edge of the workpiece opposite the site of the radial line. There the extenders may be clamped after the guide is positioned for the routing which is contained between the limits imposed by the buttons.

For purposes of illustration and not for limitation the following values and materials are listed. These are the inventor,s currently preferred values and materials, although he and those in this art recognize that many alternatives can be employed and modification made to accommodate particular routers. Indeed the inventor himself may decide to vary from the values and materials in the future, based upon experience and considerations of economy. Also although care has been made to be as accurate as possible in the completion of the following, errors may occur in transcribing and the reader is cautioned to verify the following by the well known engineering computational and experimental techniques.

For a Black & Decker brand router model No. 7610 (and similar routers) the headpiece 16 is preferably made of aluminum (although thermo-formed plastics may also be used) and is approximately $2\frac{1}{4} \times 6\frac{3}{4} \times 14\frac{1}{2}$ inches in size. The guide rails 12 are preferably, made of aluminum. One paired set is approximately ¾×1¾×28 inches in size with a slot 14 being ¼ inch wide 22¾ inches long and ½ inch deep (to 14E). The guide rails 12 are affixed to headpiece 16 at an inside separation of 6 inches to accommodate this router and ones of like size.

Other rails similar to 12E are preferably made in the same way but in lengths of 42 and 18 inches. Note should be made of the fact that all paired rail units can be substituted for the main rails 12 when desired (as on a short workpiece 38).

The rear headpiece member 19 is preferably also made of aluminum and is ¾ by 4⅛ by 12½ inches in overall size.

The bridge 90 is preferably formed of aluminum and is ¾×1¼×9½ inches in overall dimensions. The holes 92 are of ¼ inch diameter and hole 93 is of ⅜ inch diameter.

The T-member 84 is preferably made of transparent and translucent plastic and is approximately 4½ inches in length.

The stop member 74 is preferably made of transparent plastic and is approximately ⅛×¾×8 inches in size with a slot 75 being ¼ inch wide by 7 inches long. The shank is ⅛ inch thick with the head being 1¼ inches high.

One of the members 68 is approximately ¼ inch thick by 11 inches long by 1 inch wide with a slot 68S 9 inches long and ¼ inch wide, preferably rigid plastic. Others may vary only in overall length and length of slot.

The cradle 100 is preferably made of aluminum and is approximately 1×7×9 inches in overall size.

The member 130 is preferably made of aluminum and is 1¼ by 2¼ by 3¼ inches in overall size with a thickness of 7/16 inch to the part 136 and ½ inch for part 132.

The shield 110 (FIG. 19) is preferably made of formed sheet metal and is approximately 1⅛ by 6 by 9½ inches in size.

The pivot member 140 is preferably made of aluminum, has a large diameter of 2 inches and a height of 1½ inches. The fibrous pad 150 is preferably a paper fabric impregnated with solvent-dissolved rubber type adhesive. Alternatively an adhesive, such as "Pliobond" brand adhesive sold by Goodyear could be applied to the top of the pad by the user. In either case ordinary carpenters, polyvinyl glue is applied to the bottom to fasten it to the workpiece.

It should now be appreciated that a versatile router guide and kit has been described and depicted that may perform among different operations. The guide may be brought to the workpiece and is not tied down to a workbench or worktable; and as such may be used more easily and in more applications.

While one particular embodiment of the invention has been shown and described, it will be obvious to those skilled in the art that changes and modifications may be made without departing from the invention and, therefore, the aim in the appended claims is to cover all such changes and modifications as fall within the true spirit and scope of the invention.

I claim:

1. A guide apparatus for a router that is portable and easily moved and adjusted to fit and used with different sized workpieces, comprising:
   a pair of side rail members;
   means attachable to each of said rail members spanning between them so as to secure them in a parallel but spaced apart relationship, spaced at a separation that receives, in a guiding fit, the base of the router, and for releasably coupling the apparatus to a workpiece so that the router may be guided thereon without the need for any attachment of the guide apparatus nor the router to any other support, with said means and side rail members being attachable in different positions so as to accommodate the apparatus to differing sized workpieces or differing cuts therein.

2. The guide apparatus of claim 1 wherein said side rails rest on the upper surface of the workpiece; and
   said means includes:
   a headpiece that is securable to one end of each of the two rail members and may be positioned adjacent the side edge of a workpiece to butt against that side edge and has means for accepting the router with the router bit outside of the workpiece so that the router may be moved so that its bit may enter the side edge of the workpiece;
   said headpiece including a block of routerable material such as wood for edge abutting the side edge of the workpiece and serving to prevent splintering of the workpiece as the bit enters through the block.

3. The invention of claim 2 wherein:
   said block is releasably secured to the headpiece and may be replaced by other blocks therein, whereby blocks having different bits cut through them may be used as guides to precisely determine the point of entry of the bit as well as serving to prevent splintering of the workpiece upon side entry of the bit.

4. The invention of claim 2 wherein said means also includes a rear headpeice that spans the two side rail members and is adjustably secured to the side rail members so as to be secured thereto at any desired separation within a range from said first headpiece.

5. The invention of claim 4 wherein extension side rail members are provided that may be releasably affixed to said side members to extend their length and allow the rear headpiece to be releasably secured at a greater distance from the first headpiece than otherwise.

6. The invention of claim 4 wherein said headpieces each include means for allowing them to be clamped to the workpiece when transverse cuts are to be routed therein.

7. The invention of claim 1 wherein said means includes a cradle secured to the rails holding the router in one position thereto so that the apparatus and router may be moved transversely to the direction of said rails.

8. The invention of claim 7 wherein said apparatus includes means defining a pivot whereby the apparatus may be pivoted so as to make arcuate routings in a workpiece.

9. The invention of claim 1 wherein
   said means includes stop bridges spanning between said rails and means include releasable attachment means for securing the stop bridges at any position along a substantial portion of said rails.

10. The block of routerable material for use in the router guide apparatus of claim 2 said block including means adapting it to be releasably secured in the headpiece and being sized to the headpiece so that when it is so secured the router base may pass over it without obstruction.

11. The invention of claim 7 wherein a separable cradle floor unit is provided for holding a router base in the cradle and preventing it from tipping or dropping below the top surface of a workpiece.

12. The invention of claim 7 wherein the cradle may be releasably secured to said rails or slidably moved along them.

13. The invention of claim 1 wherein said means includes a pair of bridges that may be releasably secured between the said rails and stop members are provided for affixture to the bridges so as to selectively stop the movement of a router in the guide apparatus.

14. A versatile router guide kit comprising the following components that may be releasably interconnected:
- a pair of side rails having ends adapted to be secured to headpieces and means for accepting bridges;
- a pair of headpieces, having means for accepting the ends of said rails and securing said rails in a parallel spaced apart so as to form a box guide for a router between the rails;
- a pair of bridges sized to span the rails when spaced apart to receive a router therebetween, said bridge having means adapted for securing them to the rails and having means forming stops for the router, at least one of said bridges having means for pivotally securing the bridge to a workpiece;

whereby said side rails may be secured to the headpiece to form a box guide, and the bridges may be used to set stops for router movement therein, to router a workpiece linearly, or said side rails may be secured to the bridges, without the headpiece, to form a pivoting guide for routing a workpiece arcuately.

* * * * *

UNITED STATES PATENT AND TRADEMARK OFFICE
CERTIFICATE OF CORRECTION

PATENT NO. : 4,630,657
DATED : December 23, 1986
INVENTOR(S) : George Obradovich It is certified that error appears in the above-identified patent and that said Letters Patent is hereby corrected as shown below:

Column 5, line 15, "for a male" should read -- for male --.

Column 12, line 12, "complete" should read -- completes --.

Column 17, line 53, "pedestal" should read -- pedestal's --.

Column 18, line 53, "inventor,s" should read -- inventor's --.

Column 19, line 44 "carpenters," should read -- carpenters'--.

Signed and Sealed this

Twenty-fifth Day of October, 1988

*Attest:*

DONALD J. QUIGG

*Attesting Officer*   Commissioner of Patents and Trademarks